United States Patent [19]

Maxemchuk et al.

[11] 4,255,763
[45] Mar. 10, 1981

[54] TECHNIQUE FOR REDUCING TRANSMISSION ERROR PROPAGATION IN AN ADAPTIVELY PREDICTED DPCM VIDEO ENCODER

[75] Inventors: Nicholas F. Maxemchuk, Mountainside, N.J.; John A. Stuller, Rolla, Mo.

[73] Assignee: Bell Telephone Laboratories, Incorporated, Murray Hill, N.J.

[21] Appl. No.: 107,262

[22] Filed: Dec. 26, 1979

[51] Int. Cl.³ .............................................. H04N 7/12
[52] U.S. Cl. ..................................... 358/135; 358/133; 358/138; 364/515
[58] Field of Search ............... 358/135, 133, 138, 260; 364/515

[56] References Cited

U.S. PATENT DOCUMENTS 2,905,756  9/1959  Graham ............................... 358/135

Primary Examiner—Howard W. Britton
Attorney, Agent, or Firm—Barry H. Freedman

[57] ABSTRACT

Propagation of transmission errors in adaptively predicted, DPCM encoded video signals is reduced by including a leak circuit (114) in the encoder (FIG. 1). The leak circuit modifies each prediction in response to local characteristics in the area of the picture being encoded.

8 Claims, 3 Drawing Figures

ENCODER

DECODER

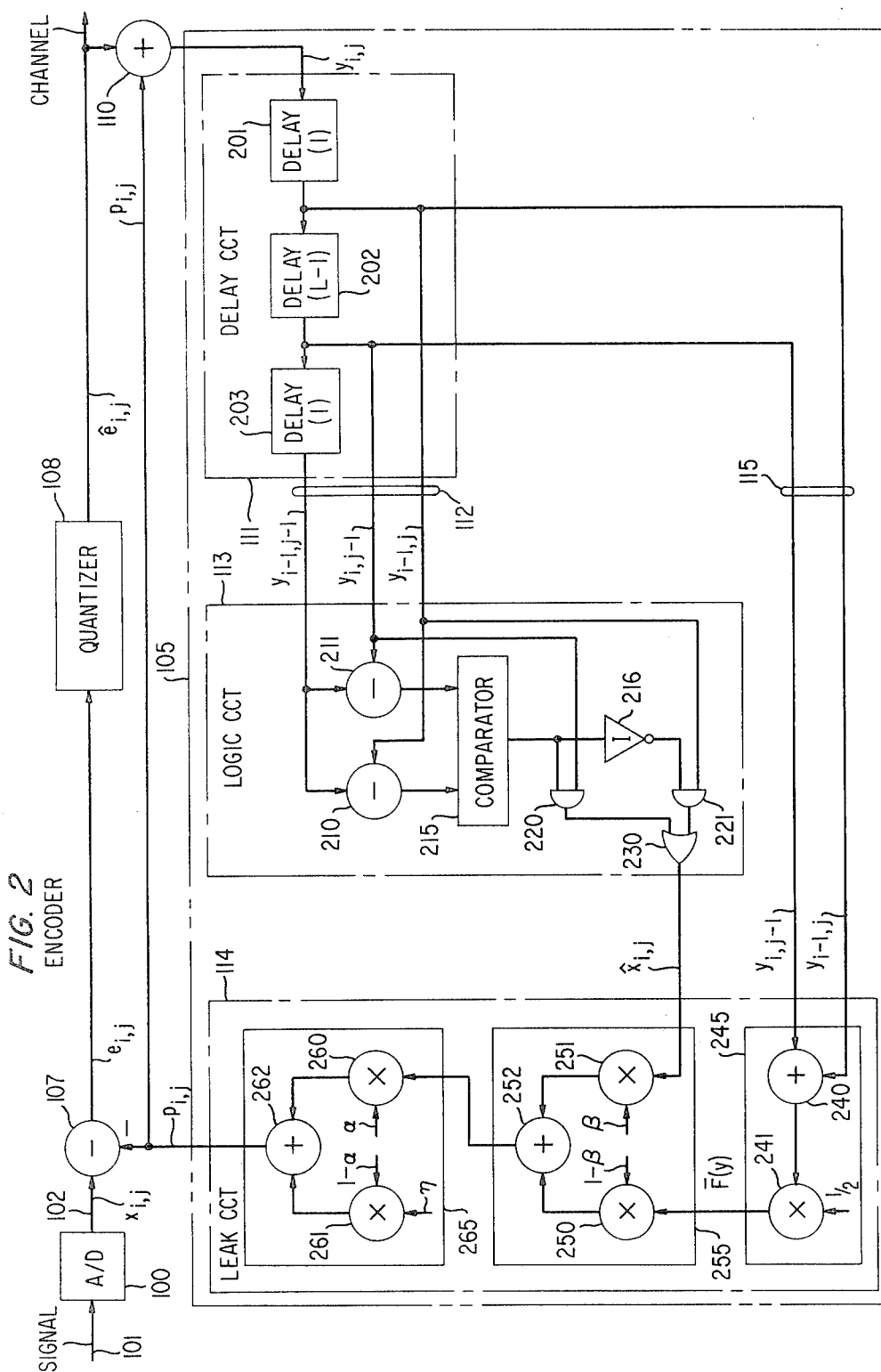
FIG. 2 ENCODER

TECHNIQUE FOR REDUCING TRANSMISSION ERROR PROPAGATION IN AN ADAPTIVELY PREDICTED DPCM VIDEO ENCODER

TECHNICAL FIELD

The present invention relates generally to digital encoding of pictorial information and, in particular, to a technique for encoding a video signal using adaptively predicted differential pulse code modulation wherein propagation of transmission errors is reduced at the receiver by intentionally introducing a "leak" in the predictors used in the system.

BACKGROUND OF THE INVENTION

In U.S. Pat. No. 2,905,756 issued to R. E. Graham on Sept. 22, 1959, a method and apparatus for reducing the bandwidth needed to transmit a television or other pictorial information signal is disclosed wherein the difference between the original signal and a prediction thereof is quantized and encoded. The prediction is formed adaptively by analyzing each of several possible predictions in light of previously encoded data and selecting the one prediction that should produce the best result. Each of the possible predictions is also formed by reference to previously encoded information available at both the transmitter and receiver, thus eliminating any need to encode predictor selection data.

Adaptive or switched predictor differential pulse code modulation (DPCM) systems of the type suggested by Graham are extremely sensitive to errors which may occur during transmission of the encoded information between the transmitter and receiver, since the effect of any transmission error is cumulative and propagates so as to contaminate all succeeding information until correction is achieved through additional processing logic. Error accumulation occurs because only the differences between each prediction and the original signal are encoded, and the pictorial information is decoded by summing all of the differences in an integrator or adder. To reduce propagation of transmission errors, some prior art systems incorporate check characters in the encoded data, and upon detection of an error, use various correlation techniques to locate the point of occurrence of the error and correct it. Because redundant information must be added to the signal, some additional bandwidth is required in the transmission medium and the receiver must be outfitted with error detection and correction logic, which can be costly.

In another approach designed to avoid the propagation of transmission errors, it has been found advantageous to intentionally introduce an attenuation or "leak" in the predictors used in both the encoder and decoder so that the predictions statistically tend to converge toward a preselected constant value. The technique works well for certain fixed predictor DPCM systems because the error in an erroneously decoded picture element eventually decays to zero in future picture elements instead of propagating indefinitely. The technique does not work as well in adaptive predictor DPCM systems, because the erroneously decoded intensity value may also affect the predictor selection rule. In this event, the decoder and the encoder use different rules to process future picture elements causing distortion in the received picture.

In view of the foregoing, it is the broad object of the present invention to improve the encoding of pictorial information so as to reduce the propagation of errors that may occur in the transmission medium between transmitter and receiver. Specific objects are to reduce error propagation in an adaptively predicted DPCM system without undue distortion of the reconstructed picture and without adding significantly to the bandwidth required for transmission or the logic needed for error detection and correction.

SUMMARY OF THE INVENTION

The foregoing and additional objects are achieved in an adaptively predicted DPCM encoding technique arranged in accordance with the present invention by introducing a leak in the predictor which is a function of the local characteristics in the area of the picture being encoded. This technique reduces error propagation and yet does not significantly distort the picture if no transmission errors occur. Conceptually, the technique can be viewed as introducing a leak not only in the predicted value but also in the predictor function so that the encoder and decoder each make a prediction having a value partly influenced by the optimum switched predictor and also by a fixed predictor using intensity values for pels in the neighborhood of the presently processed element.

BRIEF DESCRIPTION OF THE DRAWINGS

A full appreciation of the features and advantages of the present invention will be obtained by consideration of the following detailed description, when read in light of the accompanying drawings in which:

FIG. 2 is a more detailed block diagram of the encoder of FIG. 1; and

DETAILED DESCRIPTION

Figure 1:
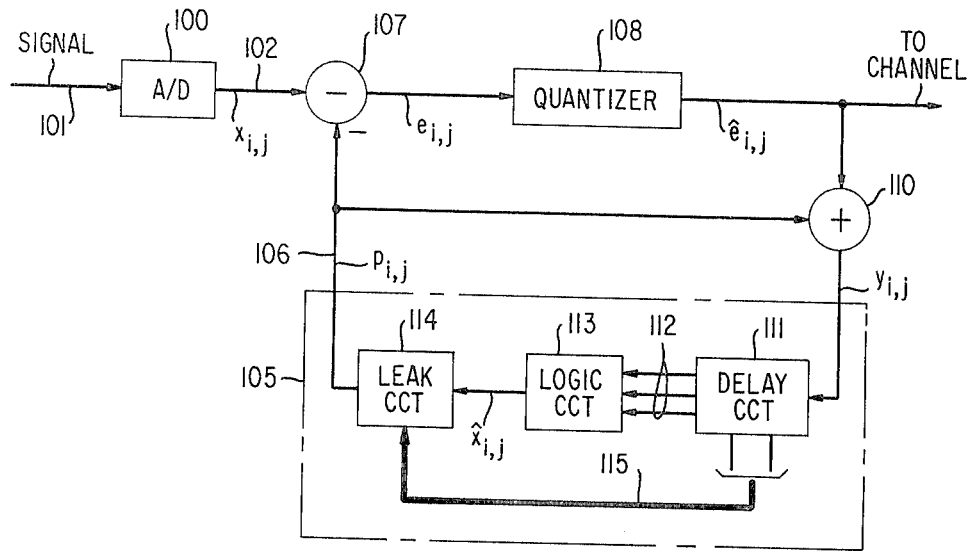
FIG. 1 is a block diagram of an adaptively predicted DPCM encoder constructed in accordance with the principles of the present invention.

FIG. 1 is a block diagram of a predictive DPCM encoder constructed in accordance with the principles of the present invention. The encoder includes an analog-to-digital converter 100 which receives an input signal in analog form on line 101 and converts the signal to a series of samples on line 102. The input signal can be obtained by scanning a picture or other visual information along a series of generally parallel scan lines and converting the picture intensity information to electrical form. The samples generated by converter 100 represent the intensities $x_{i,j}$ at a plurality of picture element (pel) locations within the picture, where the subscripts indicate the specific location corresponding to each sample. The first subscript i represents the horizontal position of the picture element along a given scan line, and the second subscript j refers to the vertical position or particular scan line on which the pel is located. For reference purposes, the picture element presently being processed is referred to as the $i,j^{th}$ pel, the preceeding pel is the $(i-1,j)^{th}$ pel, and so on. In a typical encoder, the sampling and scanning rates are adjusted to achieve about 256 samples per line and the same number of lines per frame. Where the input video information is already available in digital form, as for example, at the output of a computer or other processing apparatus, A/D converter 100 is not required.

At the heart of the encoder of FIG. 1 is an adaptive or switched predictor circuit 105 which forms a prediction $p_{i,j}$ on line 106, of the value of each input intensity sample $x_{i,j}$. Ideally, each prediction is an exact replica of the true value $x_{i,j}$ then present on line 102. However, due to predictor processing limitations and the non-stationary nature of the input signal, prediction errors generally occur. These errors designated $e_{i,j}$ are formed in a subtractor circuit 107 and applied to a quantizer 108 which provides the encoder output $\hat{e}_{i,j}$ on line 109. Quantizer 108 usually has a nonlinear input/output characteristic so as to further compress the error signal before transmission to a remote location. Each intensity prediction $p_{i,j}$ output from predictor 105 is generated adaptively using information derived from previous outputs from the encoder. For this purpose, each quantized error value $\hat{e}_{i,j}$ is combined with the previously formed prediction $p_{i,j}$ in an adder circuit 110 to generate a reconstructed version $y_{i,j}$ of the input signal $\hat{x}_{i,j}$. These reconstructed values are then input to a delay element 111 (typically a tapped delay line) arranged to store reconstructed intensity values for a plurality of picture elements in the neighborhood or vicinity of the picture element being processed. These neighborhood values are coupled to a predictor logic circuit 113 which, generally speaking, combines various ones of the previous values to yield several predicted values, and then selects the optimum prediction which best represents the input signal value. The output of predictor logic 113, designated $\hat{x}_{i,j}$, is then applied to a leak circuit 114 which "distorts" the predicted value in the manner explained below, to reduce the effects of transmission error propagation. The output of circuit 114 is thus the final prediction $p_{i,j}$ used to form the error signal $e_{i,j}$, while the output $\hat{x}_{i,j}$ of predictor logic 113 is an intermediate prediction.

In prior art predictive encoders of the type described above, the leak introduced in circuit 114 was strictly and solely predetermined by knowledge of fixed encoder characteristics such as the total range of possible intensity values, such that the output of leak circuit 114 was the only variable which influenced the predicted value $\hat{x}_{i,j}$ generated by logic 113. In accordance with the present invention, leak circuit 114 also receives inputs (on lines 115) from delay element 111, such that the leak used to form the predicted value $p_{i,j}$ is influenced by and a mathematical function of certain ones of the stored reconstructed values of pels in the neighborhood of the element being processed.

The present invention will be better appreciated by considering a prior art "leaky" predictor found in an adaptive DPCM type described by Graham and others in more detail. In such predictors, the intermediate prediction $\hat{x}_{i,j}$ output from logic 113 is given by:

$$\hat{x}_{i,j} = F_q(y) \tag{1}$$

where Q is the total number of possible predictions and $q = 1, 2 \ldots Q$. The best prediction is chosen adaptively, according to a decision rule which is a function of previous reconstructed values (y). The encoder and decoder both use the same decision rule to switch between and select the optimum prediction, but the decoder decision may be contaminated by transmission errors which distort the values $\hat{e}_{i,j}$ and thus lead to distortion in (y) as well.

In one simple example used by Graham, two possible predictions are given by:

$$F_1(y) = y_{i-1,j} \text{ or} \tag{2}$$
$$F_2(y) = y_{i,j-1}.$$

The first prediction $F_1$ is seen to be derived from the reconstructed intensity of the pel immediately above the present pel and the second prediction $F_2$ is derived from the reconstructed intensity of the pel immediately to the left of the pel being processed. Selection of the best prediction is made according to a contour sensitive rule which searches for picture edges. Thus, $F_1$ is selected if:

$$|y_{i-1,j-1} - y_{i,j-1}| < \tag{3}$$
$$|y_{i-1,j-1} - y_{i-1,j}|$$

and $F_2$ is selected otherwise. This selection rule assumes that there is a continuim of intensity values in most pictures, and that if an edge exists (with the accompanying discontinuity in intensity), a prediction should not be made using picture elements which lie across the edge. It is to be understood that other more sophisticated combinations of neighboring pels can be used to form predictions, and that different combinations of additional reconstructed pel intensity values can be used to select the best prediction.

As stated previously, adaptive prediction generally results in more accurate coding of the image, but a serious problem arising from adaptation is the response of the system to transmission or channel errors. The effect of an error propagates over a larger area of the picture when an adaptive predictor is used than when a fixed predictor is used. Increased propagation occurs because transmission errors not only (i) contaminate the values of the elements used by the receiver in forming the different predictions but can also (ii) cause an error in the receiver's choice of the best prediction. The second effect is potentially more grievous, since the transmitter and receiver then use different choices for the prediction function, a result that, once started, can propagate.

The fixed "leak" used in the prior art reduces the effect of transmission errors by attenuating the predictor output by a constant $\alpha, (0 \leq \alpha \leq 1)$ and by adding a constant bias term so that $p_{i,j}$ assumes the form:

$$p_{i,j} = \alpha \hat{x}_{i,j} + (1-\alpha)\eta \tag{4}$$

where $\eta$ is a constant in the range of possible intensity values, and is usually preselected as the mean value of the highest and lowest values attainable by $x_{i,j}$.

Specifically, if the picture intensities can range between 0 and 255 levels of brightness, $\eta$ can be chosen as 128; other choices may, however, give better subjective results, depending upon context and system non-linearities.

Analysis of the fixed leak specified in equation (4) reveals that the prediction $p_{i,j}$ can be viewed as a weighted combination of locally inferred and globally given knowledge of the input signal, since multiplication by $\alpha < 1$ decreases the effect on the prediction $p_{i,j}$ of the intermediate prediction $\hat{x}_{i,j}$ and the bias term causes the output to tend toward the constant $\eta$. The error $\hat{e}_{i,j}$ which is transmitted to the receiver is the quantized version of the error term having the form:

$$x_{i,j} - p_{i,j} = x_{i,j} - [\alpha \hat{x}_{i,j} + (1-\alpha)\eta] \tag{5}$$

which can be rewritten as:

$$e_{i,j} = \alpha(x_{i,j} - \hat{x}_{i,j}) + (1-\alpha)[x_{i,j} - \eta]. \quad (6)$$

Equation (6) consists of a first DPCM term $(x_{i,j} - \hat{x}_{i,j})$ which represents the difference between the value of one sample of the input signal and the corresponding predicted value for that sample and a second PCM term $[x_{i,j} - \eta]$ which is proportional only to the input signal itself. As $\alpha$ varies from 1 to zero, the significance of the first term is decreased, while the second term becomes more important. This kind of attenuation of the predicted value $\hat{x}_{i,j}$ trades error propagation with transmission rate. For $\alpha \approx 1$, the system is essentially DPCM having a low rate but large susceptability to error. Conversely, for small $\alpha$, the system approaches a PCM arrangement wherein a high transmission rate is needed but in which an error in one PCM value will not affect the value of succeeding samples. It should also be noted that this fixed leak technique does not address the problem of the selection of the best prediction, and therefore is a remedy only for the first problem (i) noted above.

In accordance with the present invention, the effect of transmission error propagation in an adaptively predicted DPCM encoder is further reduced by arranging circuit 114 so as to introduce a leak in the prediction $\hat{x}_{i,j}$ which is a function of reconstructed intensity values (y) of pels in the neighborhood of the pel being processed. This technique is equivalent to attenuating (or leaking) the criteria or rule used to select the best prediction as well as the predicted value itself. With this arrangement, the intermediate prediction $\hat{x}_{i,j}$ output from logic 113 is first modified to yield a prediction $$x'_{i,j} = \beta \hat{x}_{i,j} + (1-\beta)\overline{F}(y) \quad (7)$$

where $\overline{F}(y)$ is a fixed predictor. The modified prediction $x'_{i,j}$ is then leaked according to equation (4) as in prior art encoding techniques, to yield the prediction $p_{i,j}$. A reasonable choice for $\overline{F}(y)$ is the mean of all of the possible predictions for the presently processed sample. For the example given above, $$\overline{F}(y) = \frac{1}{2}[Y_{i-1,j} + Y_{i,j-1}] \quad (8)$$

indicating that the reconstructed intensity values for pels in the vicinity of the presently processed pel are used in selection of the best prediction.

It is to be noted from equation (7) that as $\beta$ varies from one to zero, the encoder changes from fully adaptive DPCM to non-adaptive DPCM. The smaller the value of $\beta$, the closer the predictor is to being fixed, thereby reducing the effect (ii above) of error propagation due to use of the wrong predictor. However, with a fully fixed predictor, the advantages in fidelity gained through a switched predictor are lost.

Equation (7) may be combined with equation (4) to yield the following expression for the output of predictor 105:

$$p_{i,j} = \alpha\beta\hat{x}_{i,j} + \alpha(1-\beta)\overline{F}(y) + (1-\alpha)\eta. \quad (9)$$

From equation (9), it is seen that a prediction derived in accordance with the technique of the present invention is a function of (1) the switched predictor $\hat{x}_{i,j}$ of the type used by Graham and others, (2) the local intensity $\overline{F}(y)$ in the neighborhood of the $(i,j)^{th}$ pel, and (3) a constant $(1-\alpha)\eta$ having a value derived from knowledge of the range of picture intensity values.

A more detailed circuit diagram of one embodiment of the encoder of FIG. 1 is shown in FIG. 2 wherein elements identical to those in FIG. 1 bear the same numerical designations. In this embodiment, delay element 111 consists of three serially connected delay circuits 201, 202 and 203. Circuits 201 and 203 each provide a delay equal to one sample interval, while circuit 202 provides a delay L-1 equivalent to the time needed to scan one complete line of picture information, less one sample interval. With this arrangement, the output $y_{i-1,j-1}$ of circuit 203 is the intensity of the picture element on the previous scan line which is immediately to the left of the present pel, assuming scanning from left to right. The output $y_{i,j-1}$ from circuit 202 is the intensity of the picture element immediately above the present pel, and the output $y_{i-1,j}$ from circuit 201 is the intensity for the pel to the left of the present pel on the same scan line.

Still using the Graham type predictive encoder described by equations (2) and (3), the differences specified in equation (3) are formed by applying the outputs of circuits 201 and 203 to a first subtractor 210 and applying the outputs of circuits 202 and 203 to a second subtractor 211. The magnitudes of the differences formed by the subtractors are compared in a comparator 215, which provides a high output when the output from subtractor 210 exceeds the output from subtractor 211 and a low output otherwise. With the output of comparator 215 high, the inequality of equation (3) is not satisfied, and the second prediction $F_2$ is selected by enabling AND gate 220 to pass the output $y_{i,j-1}$ from circuit 202 to OR gate 230. When the output of comparator 215 is low, the inequality of equation (3) is satisfied and the $F_1$ prediction is selected. In this case, the output of inverter 216 is high, enabling AND gate 221 to pass the output $y_{i-1,j}$ from circuit 201 to OR gate 230. The output of this OR gate is $\hat{x}_{i,j}$, the intermediate prediction which corresponds to the output of a prior art encoder of the type described by Graham.

In accordance with the invention, leak circuit 114 responds to both the output from OR gate 230 and inputs received from delay element 111. If equation (8) is used to derive local intensity values for pels in the neighborhood of the pel being processed, circuit 114 may include an averager circuit 245 comprising an adder 240 for receiving the outputs $y_{i-1,j}$ and $y_{i,j-1}$ from delay circuits 201 and 202 and a multiplexer 241 for multiplying the sum by the factor of one-half to yield the local average value $\overline{F}(y)$.

The output of multiplier 241, corresponding to a "fixed" prediction, and the output from OR gate 230, corresponding to a "switched" prediction, are applied to a first attenuator or leak stage 255 consisting of multipliers 250 and 251. In this circuit, $\hat{x}_{i,j}$ is attenuated by a factor $\beta$ while $\overline{F}(y)$ is attenuated by a factor $1-\beta$. The outputs of multipliers 250 and 251 are then combined in an adder 252 to yield $x'_{i,j}$, as in equation (7). This value is next attenuated in a second stage 265 by multiplying $x'_{i,j}$ by a factor $\alpha$ in a multiplier 260. The product of the preselected constant $\eta$ and the factor $(1-\alpha)$ is concurrently formed in multiplier 261, and the outputs of multipliers 260 and 261 combined in an adder 262 to yield the desired prediction $p_{i,j}$ in accordance with equation (9). This prediction is applied to both adder 110 and subtractor 107 as in FIG. 1.

Figure 3:
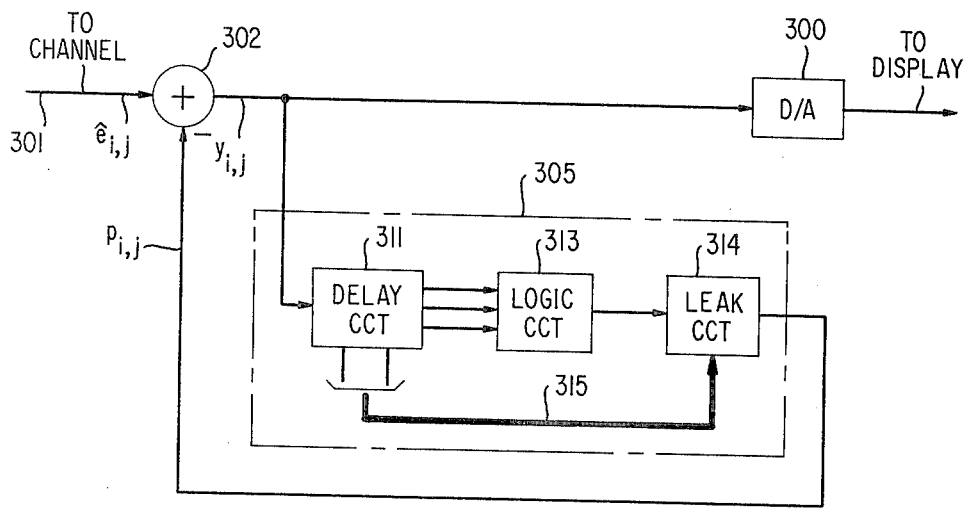
FIG. 3 is a block diagram of a decoder for use with the encoder of FIGS. 1 or 2.

A decoder constructed in accordance with the present invention is shown in block diagram form in FIG. 3. The encoded error signal $\hat{e}_{i,j}$ received on line 301 is applied to one input of an adder 302 which receives a second input $p_{i,j}$ from predictor 305 which is identical to predictor 105 of FIG. 1. This output of adder 302 is the reconstructed version $y_{i,j}$ of the input signal, which is applied to the input of predictor 305 and to a digital-to-analog converter 300 which performs the complementary function of converter 100 of FIG. 1. The output of converter 300 is the recovered video signal which may be applied to a desired display or utilization device.

Predictor 305, like predictor 105, includes delay element 311, predictor logic 313 and a leak circuit 314, all identical to the corresponding circuits in FIG. 1. Leak circuit 314 receives inputs from delay circuit 311 on lines 315 and is arranged to provide an output in accordance with equation (9). Further description of the decoder is not necessary, as those skilled in the art will appreciate the similar nature of the receiver and transmitter in DPCM systems.

The advantages of the present invention were confirmed in simulations using various test photographs, and some of the results obtained are described and depicted in applicants' article entitled "Reduction of Transmission Error Propagation in Adaptive Prediction DPCM Pictures" which appeared in the July-August 1979 issue of the *Bell System Technical Journal* beginning at page 1413. FIG. 1 in that article depicts the effect of a $10^{-4}$ channel bit error probability on a picture being processed using the adaptive coding technique described by Graham. When a fixed predictor leak is introduced in the processing in accordance with equation (4), the distortion due to transmission error propagation improves somewhat as shown in FIG. 3. However, significant errors still exist as shown in FIG. 4 of that article. When the present invention is used with values of $\alpha = 15/16$, $\beta = \frac{3}{4}$ and $\eta = 128$, the received picture is as shown in FIG. 5; the significant decrease in transmission error propagation is seen clearly by comparison of FIG. 6 with FIG. 4. For different values of $\alpha$ and $\beta$, the received picture is shown in FIG. 7, and FIG. 8 again shows the almost total elimination of distortion due to transmission error propagation. The effects of the present invention on quantization noise are depicted in FIGS. 9–12 of the *BSTJ* article. These figures indicate that in the absence of transmission errors, the distortion introduced by processing in accordance with equation (9) is not harmful to picture fidelity. In this regard, the quantizing noise shown in FIGS. 10 and 11, which correspond to the values of $\alpha$ and $\beta$ used to derive the pictures of FIGS. 5 and 7, respectively, are no worse than the quantizing noise shown in FIG. 9 for adaptive prediction without any leak, and FIG. 10 for prediction leak only.

We claim:

1. Apparatus for encoding a video signal representing the intensity of picture elements (pels) of a picture including:

means (105) for predicting the intensity of each pel as a function of reconstructed intensity values of previously encoded pels;

means (107) for forming an error signal indicative of the difference between the intensity of each pel and the predicted intensity thereof;

means (108) for quantizing said error signal; and means (110) for combining the quantized error signal with said predicted intensity to form said reconstructed intensity value, wherein said predicting means (105) includes:

first means (113) for forming an intermediate prediction of the intensity of said each pel as a function of the reconstructed intensity value of at least a selected one of the pels in the neighborhood thereof; and second means (114) for forming said predicted intensity as a function of said intermediate prediction, characterized in that said second forming means (114) forms said predicted intensity also as a function of the reconstructed intensity values of at least first and second ones of said neighboring pels.

2. The invention defined in claim 1 wherein said predicting means (105) further includes means (111) for storing reconstructed intensity values for pels in said neighborhood of said each pel, and said first and second means (113 and 114) are each responsive to said storing means (111).

3. The invention defined in claim 2 wherein said intermediate prediction ($\hat{x}_{i,j}$) is modified to form said predicted intensity ($p_{i,j}$) in accordance with:

$$p_{i,j} = \alpha\beta\hat{x}_{i,j} + \alpha(1-\alpha)\overline{F}(y) + (1-\alpha)\eta$$

where $\alpha$ and $\beta$ are scaling constants $0 < \alpha < 1$, $0 < \beta < 1$, $\eta$ is a preselected constant derived from the maximum range of intensity of said elements, and $\overline{F}(y)$ is the local intensity in the neighborhood of said each pel.

4. The invention defined in claim 2 wherein said second forming means includes:

(a) an average circuit (245) for deriving the local intensity in the neighborhood of said each pel, (b) a first attenuator (255) for forming the sum of (1) said intermediate prediction attenuated by a factor $\beta$, and (2) said local intensity attenuated by a factor $1-\beta$, where $1 < \beta < 1$, and (c) a second attenuator (265) for forming the sum of (1) the output of said first attenuator attenuated by a factor $\alpha$, and (2) a predetermined constant $\eta$ attenuated by a factor $1-\alpha$, where $0 < \alpha < 1$ and $\eta$ is near the middle of the range of intensity values of said pels.

5. Apparatus for encoding a video signal comprising a series of samples each representing the intensity of an associated element of a picture, comprising:

(a) means for predicting the value of each sample based upon the values of prior samples;

(b) means for modifying each prediction to reduce the effects of transmission errors on the decoded version of said video signal, and (c) means for transmitting the error signal formed by subtracting each modified prediction from the corresponding one of said samples, wherein said modifying means includes means for attenuating said prediction as a function of (1) the intensity of ones of said picture elements in the vicinity of the element associated with the prediction and (2) the range of possible intensity values for said picture elements.

6. The invention defined in claim 5 wherein said attenuating means is arranged to provide a modified prediction $$p_{i,j} = \alpha\beta\hat{x}_{i,j} + \alpha(1-\beta)\overline{F}(y) + (1-\alpha)\eta$$

where $\hat{x}_{i,j}$ is said predicted value, $\overline{F}(y)$ is a function of the intensity of said ones of said picture elements in said vicinity, $\alpha$ and $\beta$ are constants between zero and one, and $\eta$ is a preselected constant near the middle of said range of possible intensity values.

7. The invention defined in claim 6 wherein said apparatus also includes:

(1) means for forming reconstructed versions of each sample using outputs from said transmitting means and said modifying means, and (2) means for storing ones of said reconstructed versions, wherein said predicting means and said modifying means are each responsive to said storing means.

8. A method of encoding a video signal representing the intensity of picture elements (pels) of a picture including the steps of:

predicting the intensity of each pel as a function of reconstructed intensity values of previously encoded pels;

forming an error signal indicative of the difference between the intensity of each pel and the predicted intensity thereof;

quantizing said error signal; and combining the quantized error signal with said predicted intensity to form said reconstructed intensity value, wherein said predicting step includes the steps of:

forming an intermediate prediction of the intensity of said each pel as a function of the reconstructed intensity value of at least a selected one of the pels in the neighborhood thereof; and forming said predicted intensity as a function of said intermediate prediction, characterized in that said last mentioned forming step includes forming said predicted intensity also as a function of the reconstructed intensity values of at least first and second ones of said neighboring pels.

* * * * *